United States Patent
Chen

(10) Patent No.: US 9,615,345 B2
(45) Date of Patent: Apr. 4, 2017

(54) TELECOMMUNICATIONS SYSTEM AND METHOD

(75) Inventor: Xiaobao Chen, Bath (GB)

(73) Assignee: 3G LICENSING S.A., Luxembourg (LU)

( * ) Notice: Subject to any disclaimer, the term of this patent is extended or adjusted under 35 U.S.C. 154(b) by 568 days.

(21) Appl. No.: 12/666,984

(22) PCT Filed: Jun. 26, 2008

(86) PCT No.: PCT/EP2008/058161
§ 371 (c)(1),
(2), (4) Date: May 18, 2010

(87) PCT Pub. No.: WO2009/000886
PCT Pub. Date: Dec. 31, 2008

(65) Prior Publication Data
US 2010/0246509 A1    Sep. 30, 2010

(30) Foreign Application Priority Data

Jun. 26, 2007  (EP) .................................. 07290790

(51) Int. Cl.
*H04W 4/00* (2009.01)
*H04W 60/00* (2009.01)
(Continued)

(52) U.S. Cl.
CPC .............. *H04W 60/00* (2013.01); *H04W 8/26* (2013.01); *H04W 80/04* (2013.01)

(58) Field of Classification Search
CPC ........ H04W 60/00; H04W 8/26; H04W 80/04
(Continued)

(56) References Cited

U.S. PATENT DOCUMENTS 7,936,761 B2 *  5/2011  Takeda ..................... 370/395.21
8,345,606 B2    1/2013  Chen et al.
(Continued)

FOREIGN PATENT DOCUMENTS

| CN | 1685668 A | 10/2005 |
| CN | 101730997 A | 6/2010 |
| EP | 2 007 097 A1 * | 6/2007 ............. H04L 29/06 |

OTHER PUBLICATIONS

Orange: "Initial Attach procedure for GTP-based Roaming with non-3GPP Accesses, S2-072655", 3GPP TSG SA WG2 Architecture—S2-58, [Online] Jun. 19, 2007 (Jun. 19, 2007), XP002463933, retrieved from the Internet at 3gpp. org/ftp/tsg-sa/WG2-Arch/TSGS2_58_0rlando/Docs/S2-072655.zip> [retrieved on Dec. 28, 2009].

(Continued)

*Primary Examiner* — Faisal Choudhury
(74) *Attorney, Agent, or Firm* — David D. Brush; Westman Champlin & Koehler, P.A.

(57) ABSTRACT

A telecommunications system is arranged to provide a facility for communicating data to and from a mobile node using an internet protocol. The system includes a first home access network, which includes a home gateway node, a second visited access network, which includes a visited serving gateway node, and a wireless access gateway operable to communicate data to and from the mobile node using the internet protocol. The mobile node is operable to communicate a binding update message to the visited serving gateway node of the second visited access network via the wireless access gateway using the internet protocol. The binding update message includes a unique identifier of the mobile node, and a request for an internet protocol address for the mobile node as if the mobile node were attached to the first home access network (home IP address). In one example the unique identifier is an International Mobile (Continued)

Subscriber Identity (IMSI) number or the like. The visited serving gateway node of the second visited access network is operable, in response to the binding update message, to identify from the unique identifier of the mobile node the first home access network of the mobile node and to communicate the request for a home internet protocol address to the home gateway node. The home gateway node of the first home network is responsive to the request to allocate a home internet protocol address to the mobile node.

Embodiments of the present invention provide a mobile node with roaming facilities as afforded by a 3GPP network, although the mobile node may have attached to a non-3GPP network, by arranging for the visited serving gateway node to connect to a home network of the mobile node, using for example a GPRS Tunnelling Protocol.

11 Claims, 5 Drawing Sheets

(51) Int. Cl.
  *H04W 8/26* (2009.01)
  *H04W 80/04* (2009.01)
(58) Field of Classification Search
  USPC .......................................................... 370/329
  See application file for complete search history.

(56) References Cited

U.S. PATENT DOCUMENTS

| | | | | |
|---|---|---|---|---|
| 2006/0079234 A1* | 4/2006 | Ishikawa | | 455/436 |
| 2007/0060097 A1* | 3/2007 | Edge et al. | | 455/404.1 |
| 2007/0115898 A1* | 5/2007 | Stein | H04L 63/0272 | |
| | | | | 370/338 |
| 2008/0310358 A1* | 12/2008 | Shaheen | H04W 48/14 | |
| | | | | 370/329 |
| 2008/0316972 A1* | 12/2008 | Shaheen | H04W 36/0033 | |
| | | | | 370/331 |
| 2009/0059829 A1* | 3/2009 | Bachmann | H04W 52/0235 | |
| | | | | 370/311 |
| 2009/0201852 A1* | 8/2009 | Chen | | 370/328 |
| 2009/0318147 A1* | 12/2009 | Zhang | H04W 8/26 | |
| | | | | 455/435.1 |
| 2010/0054222 A1* | 3/2010 | Rune | H04L 29/12066 | |
| | | | | 370/338 |
| 2010/0246509 A1 | 9/2010 | Chen | | |

OTHER PUBLICATIONS

3GPP SA WG2: "3rd Generation Partnership Project; Technical Specification Group Services and System Aspects ; Architecture Enhancements for non-3GPP accesses (Release 8), 3GPP TS 23.402 V1.1.0", 3GPP Standards Technical Specification, [Online] Jun. 19, 2007 (Jun. 19, 2007), XP002463936, Retrieved from the Internet : URL: http://www.3gpp.org/ftp/Specs/archive/23-series/23.402/23402-110.zip> [retrieved on Dec. 28, 2009].

Ericsson: "PDN GW selection for host based mobility, S2-072516", 3GPP TSG SA WG2 Architecture S2-58, [Online] Jun. 19, 2007 (Jun. 19, 2007), XP002463934, Retrieved from the Internet: URL: http://www.3gpp.org/ftp/tsg-sa/WG2-Arch/TSGS2_58_0rlando/Docs/S2-072516.zip> [retrieved on Dec. 28, 20008].

3GPP TS 23.401, V1.0.0 (May 2007) Technical Specification, 3rd Generation Partnership Project; Technical Specification Group Services and System Aspects; GPRS enhancements for E-UTRAN access (Release 8); GSM Global System for Mobile Communications, 50 pages.

3GPP TS 23.402, V1.0.0 (May 2007) Technical Specification, 3rd Generation Partnership Project; Technical Specification Group Services and System Aspects; Architecture Enhancements for non-3GPP accesses (Release 8); GSM Global System for Mobile Communications, 50 pages.

3GPP TS 33.234, V6.9.0 (Mar. 2007) Technical Specification, 3rd Generation Partnership Project; Technical Specification Group Services and System Aspects; 3G Security; Wireless Local Area Network (WLAN) interworking security (Release 6), 86 pages.

RFC 2002 "IP Mobility Support", Oct. 1996, 80 pages.

Mobile-IPv4 Configuration option for PPP IPCP, RFC 2290, Feb. 1998, 17 pages.

IP Mobility Support for IPV4, RFC 3220, Jan. 2002, 98 pages.

International Preliminary Report on Patentability and Written Opinion dated Jan. 5, 2010 for International Application No. PCT/EP2008/058161, filed Jun. 26, 2008.

3GPP SA WG2: "TSGS258Orlando/Docs" 3GPP TSG SA WG2 Architecture—S2-58, [Online] Jun. 29, 2007 (Jun. 29, 2007), retrieved from the internet: http://www.3gpp.org/ftp/tsg_sa/WG2_Arch/TSGS2_58_Orlando/Docs/, S2-072516, S2-072655.

English translation of a Chinese Office Action dated Dec. 5, 2016 for corresponding Chinese Application No. 201410211097.0.

* cited by examiner

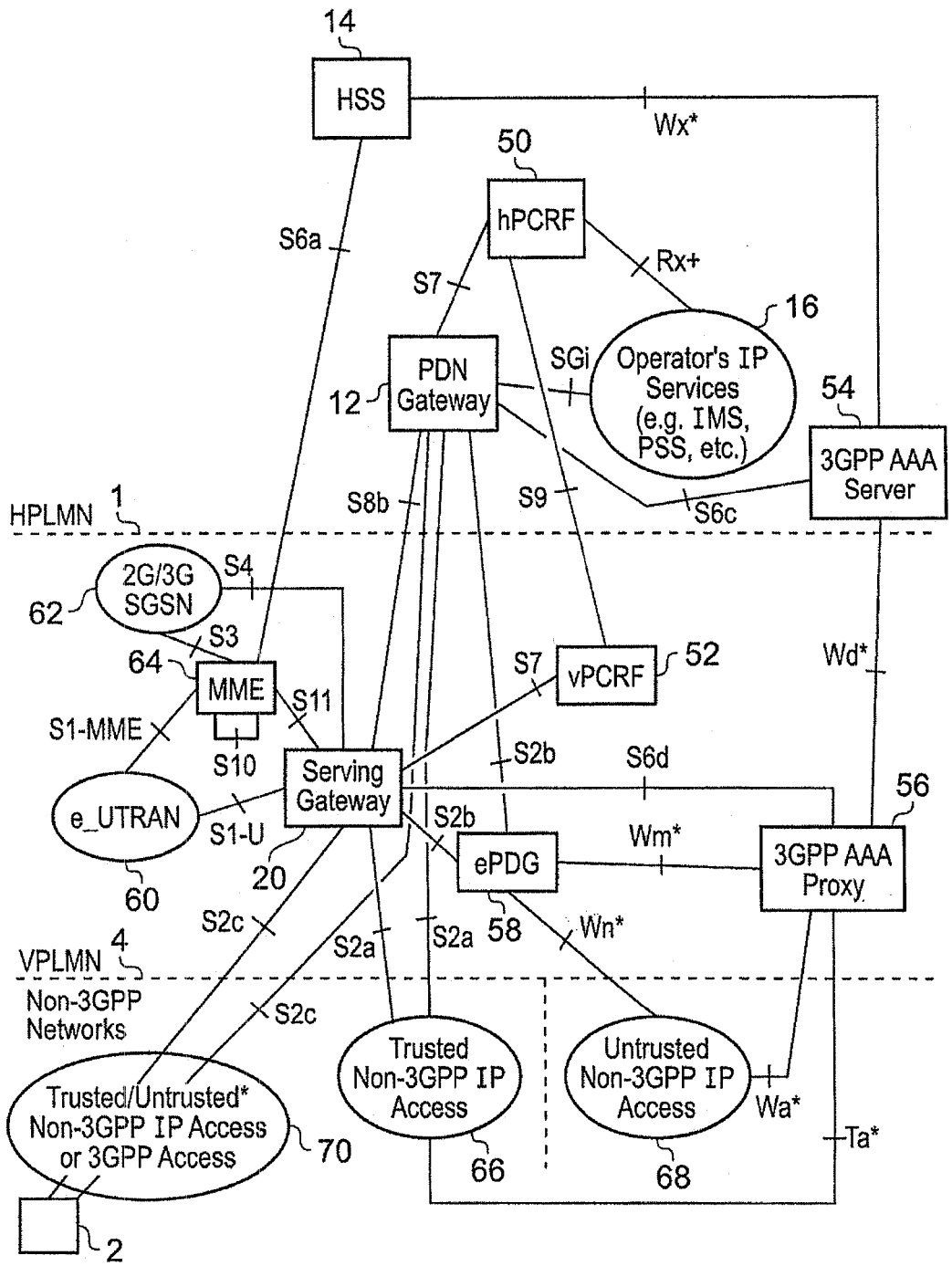
FIG. 3: Roaming Architecture for non-3Gpp Accesses, Home Routed

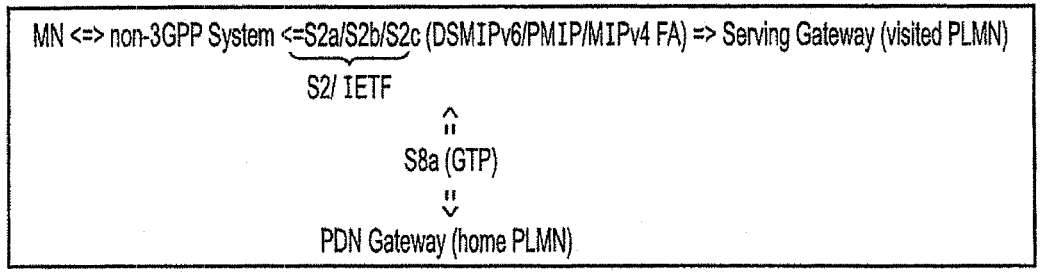
FIG. 4: MN connections to Core Network in Roaming (Home Routed Traffic)
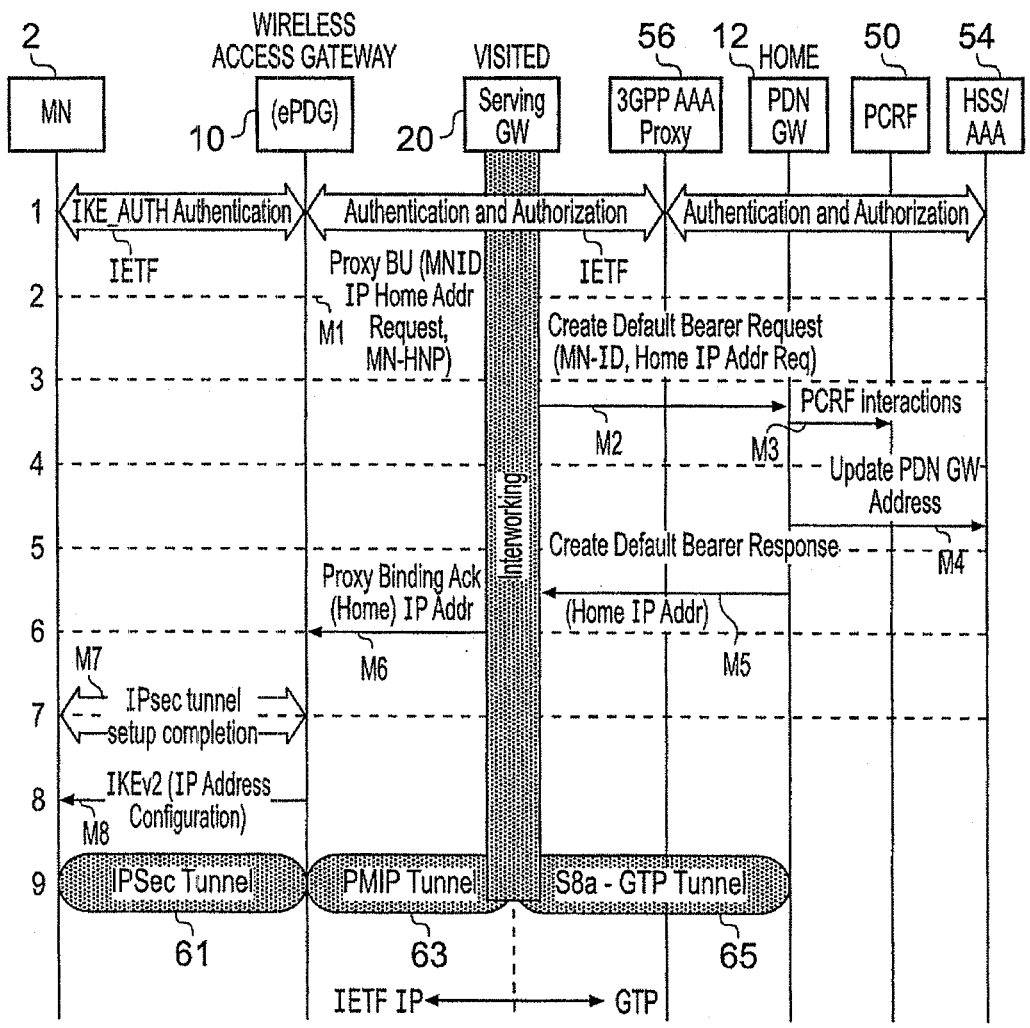
FIG. 5: Initial Attach for MN in VPLMN using PMIPv6 for non-3GPP Access with GTP based roaming with HPLMN

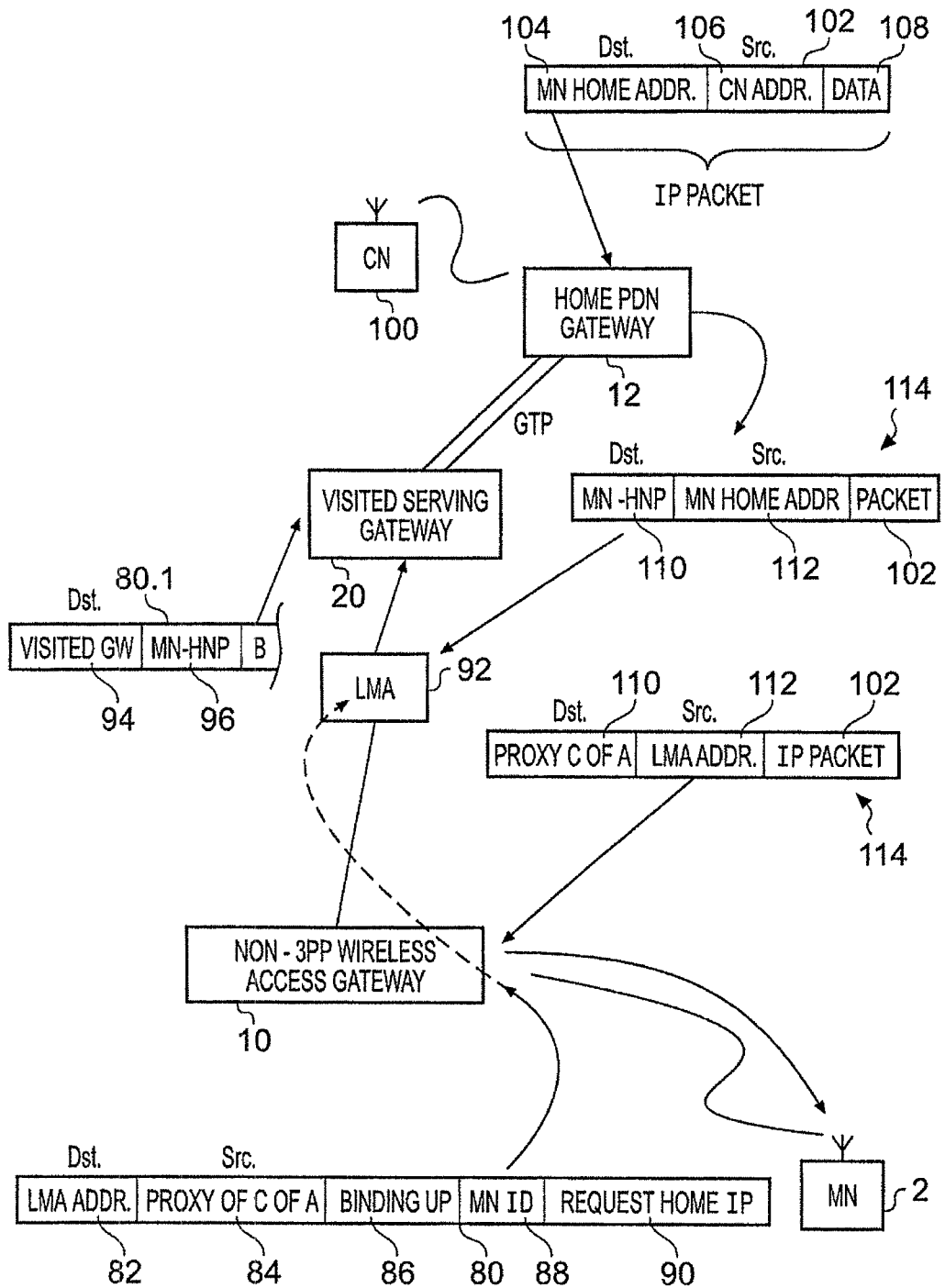
FIG. 6: PMIP Address Management

TELECOMMUNICATIONS SYSTEM AND METHOD

CROSS-REFERENCE TO RELATED APPLICATION

This application is a National Stage of International Application No. PCT/EP2008/058161, filed Jun. 26, 2008, which claims the benefit of European Patent Application (EPO) No. 07290790.0, filed Jun. 26, 2007.

FIELD OF INVENTION

The present invention relates to telecommunications systems and methods which are arranged to provide a facility for communicating data to and from a mobile node using an internet protocol. More particularly, the embodiments of the present invention provide a facility for providing services to mobile nodes which are communicating using an internet protocol which are typically associated with roaming.

BACKGROUND OF THE INVENTION

Mobile access networks provide a facility for mobile nodes to communicate data to provide communications services such as, for example, voice communications or internet browsing whilst the mobile nodes roam through the access network. Moreover, mobile access networks, such as those operating in accordance with general packet radio systems, such as those specified by the third generation project partnership (3GPP) provide a facility for a mobile node to roam to another mobile access network operating in accordance with a 3GPP standard and to continue communicating data via the network as if the mobile node was attached to its home access network. Thus, the General Packet Radio System (GPRS) standard includes network elements which facilitate roaming of a mobile node to another network whilst allowing that mobile node to communicate data and to receive services as if that mobile node was attached to its own home network.

Increasingly, internet protocols for example those defined by the Internet Engineering Task Force (IETF) are used to provide communications services to mobile nodes. Thus, wireless access interface technologies such as Wimax and Wi-Fi provide a facility for a mobile node to communicate data via a wireless access gateway. Wireless access gateways therefore form the mobile node's initial access point of non 3GPP type networks. Whilst mobile internet protocols provide a facility for mobile nodes to acquire an internet address and to communicate data using an internet protocol when attached to a wireless access gateway, it would be desirable and usually essential for such mobile nodes to receive services associated with roaming which are usually more typically associated with a network operating in accordance with a general packet radio system, such as the 3GPP GPRS system.

SUMMARY OF INVENTION

According to the present invention there is provided a telecommunications system for communicating data to and from a mobile node using an internet protocol. The telecommunications system includes a first home access network, which includes a home gateway node, a second visited access network, which includes a visited serving gateway node, and a wireless access gateway operable to communicate data to and from the mobile node using the internet protocol. The mobile node is operable to communicate a binding update message to the visited serving gateway node of the second visited access network via the wireless access gateway using the internet protocol. The binding update message includes a unique identifier of the mobile node, and a request for an internet protocol address for the mobile node as if the mobile node were attached to the first home access network (home IP address). In one example the unique identifier is an International Mobile Subscriber Identity (IMSI) number or the like. The visited serving gateway node of the second visited access network is operable, in response to the binding update message, to identify from the unique identifier of the mobile node, the first home access network of the mobile node and to communicate the request for a home internet protocol address to the home gateway node. The home gateway node of the first home network is responsive to the request to allocate a home internet protocol address to the mobile node.

Embodiments of the present invention can provide a mobile node with roaming facilities as afforded by a 3GPP network, although the mobile node may have attached to a non-3GPP network using IETF protocols, by arranging for the visited serving gateway node to connect to a home gateway node in the home network of the mobile node, using for example a General Packet Radio System (GPRS) Tunnelling Protocol.

The present invention has been devised in part by recognising that a majority of wireless access networks which have been deployed utilise a tunnelling protocol, such as the GPRS Tunnelling Protocol (GTP) in order to provide roaming services to mobile nodes. As such, although mobile nodes may be communicating using an internet protocol via a wireless access gateway operating in accordance with a non-3GPP GPRS access protocol, the present invention provides a facility for providing such roaming services to mobile nodes by arranging for a visited network to allow communication of the mobile node to its home network using the GTP. Typically there is a requirement for data to be communicated to and from a mobile node, via the mobile node's home network. As such, in order for the mobile node to receive data via its home network, the data must be communicated or tunnelled via its home network. In order to communicate data via the mobile node's home network, the mobile node must be allocated an internet protocol address as if the mobile node was attached to its home network (home IP address). Conventionally, when a mobile node roams from its home network and attaches to a wireless access gateway using an internet protocol, there are no provisions for allocating the mobile node its home IP address, since the mobile node is allocated a new IP address in order to receive internet protocol services. Without a home IP address the mobile node may not be provided with roaming services with home routed traffic via the home network for operations such as charging and legal interception.

Embodiments of the present invention arrange for the mobile node to communicate its unique mobile identifier such as an IMSI to the wireless access gateway with a binding update message and a request for a home IP address. Since the wireless access gateway will be attached to the visited network and more particularly to a visited serving gateway, the wireless access gateway is arranged to forward the request to the serving gateway of the visited network. The binding update message may be converted into a create bearer request in accordance with a tunnelling protocol such as GTP. The serving gateway of the visited network which embodies an aspect of the present invention will identify a home network of the mobile node from the unique mobile identity number and detect whether the request for creating a bearer for the mobile node should be communicated to its home network using an IETF internet protocol or the GTP. Therefore, according to embodiments of the present invention, the visited serving gateway is adapted to operate as an inter-working function and a protocol selection function to convert internet protocol messages received from the wireless access gateway requesting a home IP address of the mobile node into equivalent messages according to the GTP or an internet protocol and to communicate these messages to the home network in order that the mobile node can, acquire an IP address as if the mobile node was attached to its home network.

Whilst advantages provided by embodiments of the present invention can provide roaming services using GTP to mobile nodes which are attached to non-3GPP networks using the IETF protocols, the present invention also envisages that roaming functions may also be afforded using future internet protocols, which require a home IP address of the mobile node. Accordingly, embodiments of the present invention as defined in the appended claims include an option to communicate a request for an IP address of the mobile node to the mobile node's home network using an internet protocol. However, as explained above utilising the GTP can provide roaming services to mobile nodes using existing networks, to mobile nodes which are attached to non-3GPP networks.

Various further aspects and features of the present invention are defined in the appended claims. Other aspects according to the present invention include a mobile node, a serving gateway node as well as a telecommunications system and method.

BRIEF DESCRIPTION OF THE DRAWINGS

Embodiments of the present invention will now be described with reference to the accompanying drawings where like parts are identified with the same alphanumeric designations and in which:

FIG. 3 provides a more detail example of the telecommunications system shown in FIG. 1 operating in accordance with an embodiment of the present invention;

FIG. 4 is an illustration of connections which are required to route from a mobile node to a serving gateway node of the home access network;

FIG. 5 is a message flow diagram illustrating a sequence of messages, which are arranged to provide a roaming mobile node with an address as if attached to the home network; and FIG. 6 is a schematic block diagram illustrating an example embodiment of the present invention when operating with a proxy mobile internet protocol.

DESCRIPTION OF EXAMPLE EMBODIMENTS

General Overview

The rapid development in internet protocol (IP) based access technologies has created a requirement to introduce support for IP based access technologies such as WLAN/Wimax etc into existing GPRS/UMTS core networks. However, a technical challenge presented by this requirement is that the IP access technologies are based on IETF defined protocols for functions such as mobility for non-3GPP access systems, while the roaming services between GPRS/UMTS networks are based on a 3GPP defined GTP protocol. Embodiments of the present invention define an inter-working arrangement for supporting mobile nodes when roaming between GPRS/UMTS networks and accessing IP based access networks. In existing technologies, a serving gateway can only handle IETF protocols or 3GPP protocols as a trigger and response. As such, when the serving gateway receives the proxy binding update from a wireless access gateway, it will forward the proxy binding update to the home packet data gateway node.

A problem to be solved is to enable the serving gateway to "interwork" between IETF protocols on one side for non-3GPP accesses and the 3GPP Protocols (GTP) on the other for roaming services with home network. To achieve this, an inter-working function is provided to enable the serving gateway to "interface" between IETF protocols and the GTP protocol. In addition, the inter-working function is arranged to decide if an S8a interface (GTP based) or an S8b interface (IETF based) protocols should be selected for roaming support.

Figure 1:
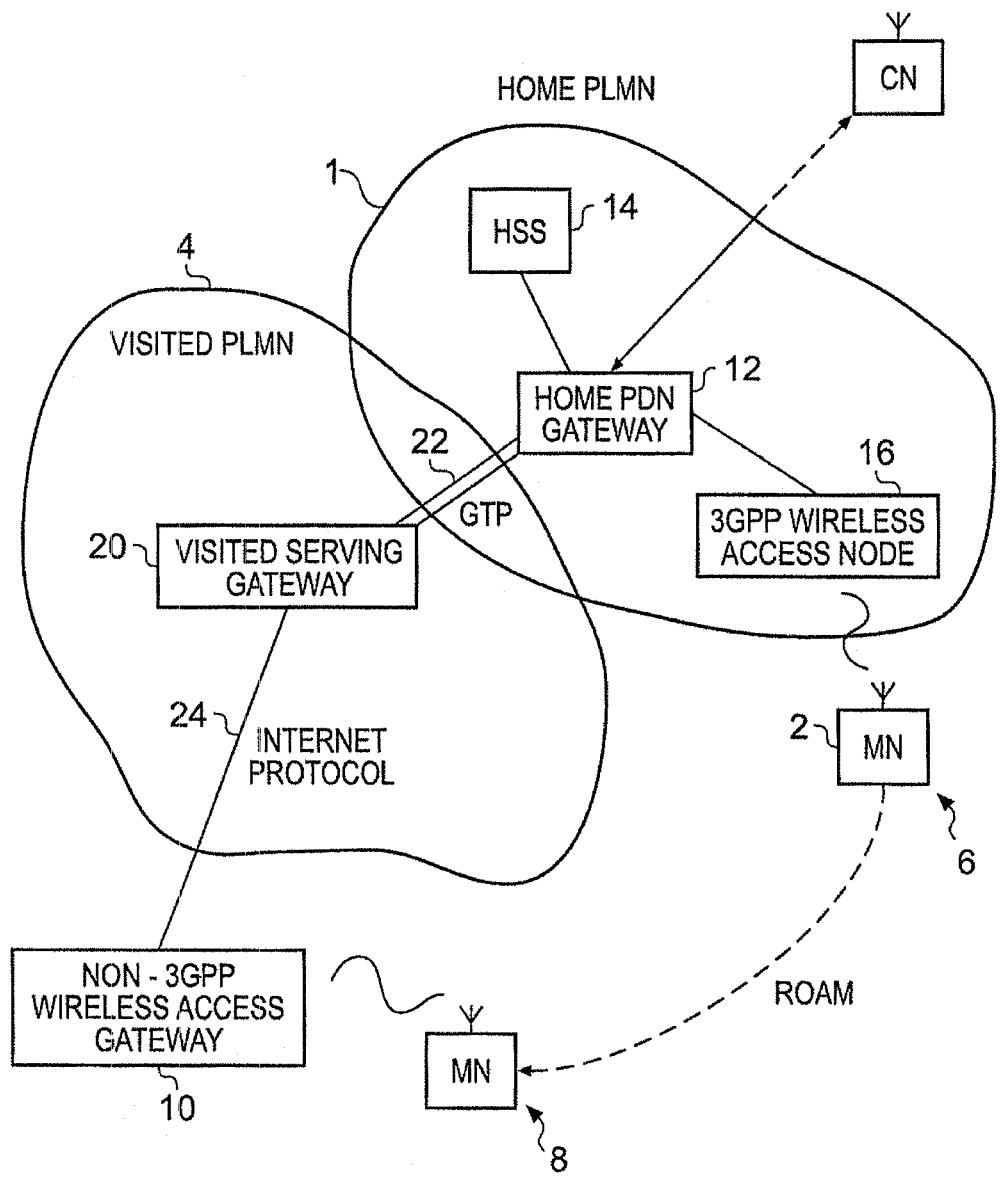
FIG. 1 is a schematic block diagram of a telecommunications system including a first home access network and a second visited access network providing a general illustration of an embodiment of the present invention.

A general illustration of a technical problem addressed by the present invention and its solution is illustrated in FIG. 1, which provides a representation of a telecommunications system which includes two mobile radio networks. According to the example embodiments shown in FIG. 1, the first mobile communications network 1 forms a home network for a mobile node (MN) 2. The second mobile communications network 4 acts as a visited network for the mobile node, which roams from a first position 6 to a second position 8 and attaches to a wireless access gateway 10. The first mobile communications network 1 is arranged to communicate data to and from the mobile node 2 in accordance with a 3GPP wireless access interface and core network protocols. Therefore, network elements such as a home packet data network gateway 12, the home subscriber server 14 and other radio access network components which are included generally within a 3GPP wireless access node 16 operate as specified according to a 3GPP standard to communicate a data to and from the mobile node 2.

Similarly, the second mobile communications network 4, which forms a visited network for the mobile node 2 includes network elements which operate in accordance with 3GPP technical specifications although for simplicity in presenting a general example illustration of the present invention only a serving gateway 20 is shown in FIG. 1. Since both the home network and the visited networks, 1, 4, are arranged to operate in accordance with 3GPP technical specifications then communication of data both signal and user plane data, between the home packet data network gateway 12 and the visited serving gateway 20 is in accordance with a general packet radio system tunnelling protocol as represented by a channel 22.

As explained above, although many mobile communications networks have been developed to comply with the 3GPP technical specifications for which roaming protocols and procedures have been developed, other access interfaces both wireless and fixed wire have been developed which support internet protocols as specified by the IETF. As such, in future, mobile nodes may become attached to an internet protocol network, which operates in accordance with an interface and protocols which are not specified by 3GPP, but for example, operate in accordance with non-3GPP protocols such as Wimax or Wi-Fi. Thus, as illustrated in FIG. 1, the mobile node 2 roams from its home network and attaches to a non-3GPP wireless access gateway 10 in a visited network. Since internet protocols do not include provisions for roaming protocols and procedures, it would be desirable for the mobile node 2 to be afforded roaming services as if the mobile node was attached to a 3GPP network, for example, the visited network 4. A technical problem therefore addressed by the present invention is to provide such protocols to the mobile node by allowing the mobile node MN 2 to acquire an internet protocol address as if the mobile node 2 was attached to its home network 1, to allow the mobile node to have access to roaming facilities by utilising wherever possible a GTP-type tunnelling protocol. To this end, the visited serving gateway 20 has been adapted and arranged to select an appropriate protocol for communicating with the home gateway of the mobile node in the mobile node's home network. Preferably, in order to receive roaming facilities the visited serving gateway selects the GTP 22. Furthermore, the mobile node delays launching applications to provide communications services to the user until the mobile node has received the home IP address from the visited serving gateway 20. According to the example embodiment shown in FIG. 2 therefore the non 3GPP wireless access gateway 10 is provided with a connection to the visited serving gateway 20 of the visited network 4, the connection 22 being arranged to operate in accordance with an internet protocol.

Figure 2:
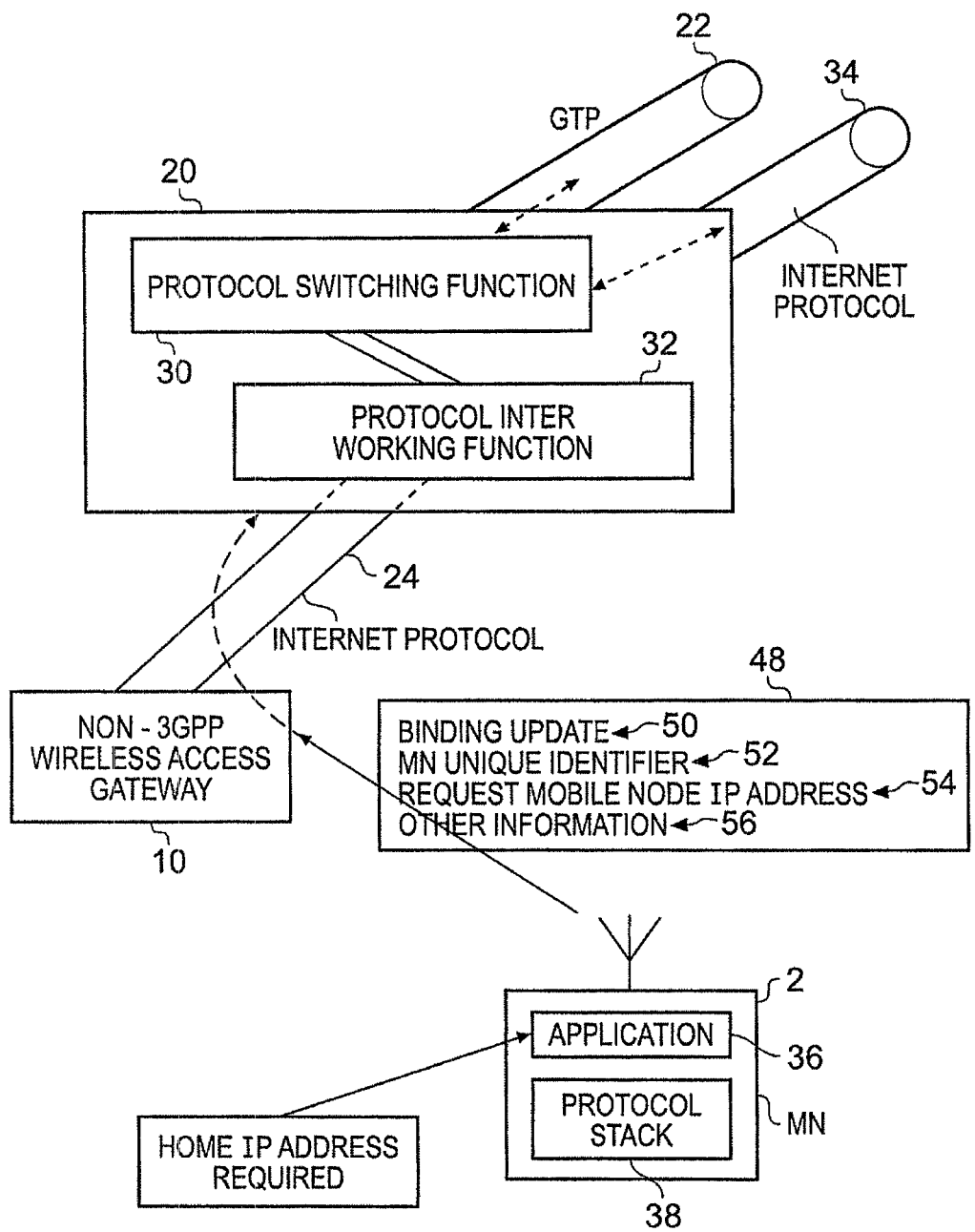
FIG. 2 is a representation of parts of the telecommunications system shown in FIG. 1 operating in accordance with an example embodiment of the present invention.

In order to provide the mobile node with a home internet protocol address (home IP address) and to select the GTP as a way of providing a communications bearer for internet packets to and from the mobile node's home network with the visited serving gateway 20 shown in FIG. 1 is adapted as shown in FIG. 2 which illustrates parts which appear in FIG. 1 in more detail. As shown in FIG. 2, the visited serving gateway 20 includes a protocol switching function 30 and a protocol inter-working function 32. The protocol switching function 30 is arranged to select either the GTP 22 or an internet protocol communications bearer for communicating signalling and user data to and from the gateway node of the mobile node's home network 12. The selection of the appropriate protocol either GTP or internet protocol is dependent on parameters such as:

Whether the mobile node's home network operates in accordance with an internet protocol
Dependent on the access network used by the mobile node, or
A default selection for example where the GTP is preferred in order to provide roaming facilities to the mobile node.

In contrast, the protocol inter-working function 32 as will be explained shortly, is arranged to perform a protocol translation between the internet protocol data received on the channel 24 and the GTP channel 22 and/or the internet protocol 34. In accordance with the present technique, the mobile node 2 does not launch an application 36 until the application as acquired a home IP address. Thereafter, a protocol stack 38 is configured in order to provide tunnelling of internet packets to the mobile node when attached to the wireless access gateway 10 when the mobile node 2 has roamed from its home network. To acquire the home IP address, the mobile node 2 communicates a binding update message 40 which includes an indication that the message is a binding update 50, the mobile nodes unique identifier 52, a request for the mobile node to acquire its home IP address 54 and other information which, as will be explained later, may be required in order to forward the mobile node to receive its home IP address (such as MN-HNP). The binding update message 48 is then communicated from the mobile node 2 to the visited serving gateway 20 via the non-3GPP wireless access gateway 10. The binding update message 48 is then received within the protocol inter-working function 32 which identifies, from the unique identifier, the home network of the mobile node. For example, the unique identifier may be the International Mobile Subscriber Identity (IMSI) number. Once the protocol inter-working function has identified the home network of the mobile node, the protocol switching function 30 will select the appropriate protocol for communicating with the gateway of the mobile node's home network. The protocol inter-working function 32 will then translate between the internet protocol communications received via the bearer channel 24 into the appropriate protocols such as the GTP for communicating on the bearer channel 22 with the gateway node the mobile node's home network. As will be explained in the more detailed explanation provided shortly, the binding update message is then converted into a create bearer message and forwarded to the mobile node's home network which then establishes a bearer and provides a home IP address for the mobile node which is then forwarded back to the mobile node 2 so that the application 36 can be launched. The following section provides a more detailed implementation of the general operation described above with reference to FIGS. 1 and 2.

More Detailed Example

FIG. 3 provides a more detailed example of the networks shown in FIG. 1. The home and visited networks include other network elements such as home and visited policy control rule functions 50, 52 which appear on both the home and the visited networks, a 3GPP AAA server 54, 56 for both the home and visited networks and various interfaces are specified S1 to S11, which may operate in accordance a 3GPP evolutionary system architecture. The visited network also includes other network elements such as an enhanced packet data gateway (ePDG) 58, an evolved UMTS Terrestrial Radio Access Network (e-UTRAN) 60, a serving gateway support node which may operate in accordance with 2G or 3G 62 and a mobility management entity (MME) 64. Similarly, the non-3GPP networks may conclude various access gateways which may be either trusted or non-trusted as represented by network elements 66, 68, 70 although essentially the only difference from the access gateway shown in FIG. 1 is that a non-trusted wireless access gateway may be required to have an interface with a 3GPP AAA (authorisation, accounting and authentication) server 56, 54.

FIG. 4 provides a representation of connections which the mobile node makes in order to communicate a request for a home IP address to the mobile node's home network. The mobile node uses a non-3GPP system access using interfaces S2a, S2b, S2c in accordance with an internet protocol to communicate with the serving gateway of the visited network. As will be explained shortly the mobile node may attach to the wireless access gateway in accordance with a dual stack mobile IPv6, a proxy mobile internet protocol, or a mobile IPv4 protocol using a foreign agent. Each of these cases may require further address information in order to complete the acquisition of a home IP address and to receive roaming functions from the home network by tunnelling internet packet data from the mobile node's home network to the mobile node when attached to the wireless access gateway 10. As shown in FIG. 4, the protocol inter-working function and selection functions may select the GTP tunnelling protocol between the serving gateway of the visited network and the gateway node of the mobile node's home network.

FIG. 5 provides an example message flow diagram process through which the mobile node acquires a home IP address from the mobile node's home network. As shown in FIG. 5 as a first function the mobile node performs an authorisation and authentication function in accordance with conventional internet protocols and so further explanation of this step will not be provided.

As already explained above with reference to FIG. 2, the mobile node communicates a binding update to the wireless access gateway 10, which includes an identifier of the mobile node and the request for an IP address. As will be explained shortly, the binding update message will also include other information such as for example the mobile node's home network proxy (MN-HNP) address if the network is configured in accordance proxy mobile IP. Thus, in message M1, the wireless access gateway 10, communicates a proxy binding update message which includes the mobile node's unique identifier, the home IP address request and other information such as the MM-HNP address to the serving gateway 20 of the visited network. If the serving gateway 20 selects the GTP bearer, then the inter-working function 32 within the gateway 20 will convert the binding update request into a create default bearer request which will include the mobile nodes identifier and the home IP address request in the form of a message M2 between the serving gate node 20 and the gateway node 12 of the mobile node's home network. In accordance with the message exchange M3 the home gateway node 12 will negotiate with the policy control rule function 50 within the home network to identify the services for which the mobile node has subscribed including any quality of service negotiation and perform any appropriate billing or security functions. In message M4, the home gateway node 12 updates the home subscriber service and/or the AAA server to identify that the mobile node is attached to a different network and moreover a different wireless access gateway. In message M5, the packet data gateway 12 of the home network then communicates the home IP address to the serving gateway node 20 in the visited network with a create default bearer response message. The inter-working function 32 within the gateway in the visited network 20 converts the create default bearer response, which is a GTP protocol message into a proxy binding update acknowledgement message M6 which includes a home IP address allocated by the packet data gateway. The wireless packet data gateway 10 then completes the tunnelling protocol bearer establishment between the mobile node 2 and the wireless access gateway 10 using an IP set tunnelling set-up completion exchange as represented by message exchange M7. Finally, an IP address configuration message is also sent from the wireless access gateway 10 to the mobile node 2 to complete the address allocation in a message M8. Thus, as illustrated in FIG. 5 between the mobile node and the wireless access gateway 10, an IP sec (internet protocol security) tunnel 60 is provided whilst between the wireless access gateway 10 and the serving gateway node 12 of visited network a mobile IP tunnel 62 is provided. However, after the gateway node 20, the tunnelling protocol is in accordance with the GTP 64 so that to the right of the visited gateway node 20 GTP tunnelling is used whereas, to the left the internet protocol is used.

Returning to FIG. 3, there are two possible implementations of the protocol inter-working function 32 shown in FIG. 2, which operates with or without the mobility management entity (MME) 64. Thus, there are two options for the inter-working function which are to operate with the MME or the operate without the MME.

As explained above, the protocol selection function (PSF) within the serving gateway node is responsible for selecting the roaming protocol to be used on S8 interface. The procedure is:

If visited serving gateway receives a (3GPP/GTP) Create Default Bearer Request (detectable by looking at the message type), it selects and activates the GTP based roaming function by default.

If visited serving gateway receives a (IETF) Binding Updates message (e.g. Proxy Binding Update in the case of using PMIP), it selects and activates the IETF protocol (either MIP or PMIP) based roaming function, unless The serving gateway protocol selection function (PSF) disables the IETF protocols and as a result, the protocol selection function activates the GTP protocol for roaming.

The protocol interworking function (IWF) in the visited serving gateway is arranged to receive an IETF protocol message (e.g. a Binding Update message). The protocol selection function disables the IETF protocol function for roaming, and the inter-working function is activated.

The inter-working function terminates the IETF messages and then tunnels (MIP tunnel, PMIP tunnel) on the S2(a/b/c) interfaces and generates/terminates the 3GPP/GTP messages and the tunnels on the S8a interface.

The protocol inter-working function can operate with or without the mobility management function. These options are:

Option. I: having MME involved but no 3GPP radio bearers/S1 bearer is established. Upon receiving the binding update with the IP address request (to be allocated by the HPLMN for home routed traffic), the protocol inter-working function generates a Service Request (could be an emulated Paging Request) and sends it to the MME. MME responds by sending a Create (Default) Bearer Request to the visited serving gateway. The benefit of doing so is to re-use the functional entity in existing 3GPP access based bearer set-up and roaming functions. However, the MME needs to be able to distinguish the service request from the serving gateway, from a request which originated from the non-3GPP access networks.

Option II: without having the MME involved, upon receiving the binding update with the IP address request (to be allocated by the HPLMN for home routed traffic), the protocol inter-working function terminates the binding update and creates a Create (Default) Bearer Request directly and sends it to the home packet data gateway. After receiving Create (Default) Bearer Response as a confirmation from the home packet data gateway for successful setting up of a GTP tunnel on the S8a interface between the VPLMN and the HPLMN, the protocol inter-working function 32 generates the binding update ACK message with the home packet date gateway allocated IP address to the mobile node included. The benefit of this option is to bypass the involvement of the MME and simplifies the control process and thus reduces the bearer set-up time.

FIG. 4 provides an illustration of network elements, protocols and interfaces to be involved when the mobile node has roamed and when home routed traffic is supported.

It shows that there are three options to consider on the interfaces to access non-3GPP access systems but use a common roaming interface S8a (GTP), therefore other inter-working scenarios can be envisaged, such as Proxy Mobile IPv6, Dual stack Mobile IP and Mobile IPv4 with a Foreign Agent.

Address Management Examples

Proxy Mobile IPv6

FIG. 6 provides a further illustration of the operation of an embodiment of the present invention in which the non-3GPP wireless access gateway operates in accordance with Proxy Mobile IPv6. Proxy Mobile Internet Protocol version 6 (PMIPv6) has been developed to manage mobility locally, within a visited network. As such, an MIPv6 domain address is allocated as the "home" address when the mobile node is an MIPv6 domain, which corresponds to a visited network, to which the MN is currently attached. The MIPv6 domain address is represented as MN's Home Network Prefix (MN-HNP). According to the PMIPv6 proposed standard, a network element which allocates MN-HNP address is a Local Mobile Agent (LMA), which forms a topological anchor of MN-HNP. In the non-roaming case or roaming with local breakout, the LMA is located in the VPLMN. The MN-HNP is the address in the VPLMN domain (being the PMIPv6 domain). All traffic sent to MN will be received by the LMA and then through the tunnel to the wireless access gateway which then subsequently are sent to the mobile nodes.

As would be appreciated by those acquainted with internet protocols, mobile IPv6 does not include foreign agents in order to perform route optimisation in which a mobile node which has roamed to a visited network can tunnel internet protocol packets locally using a care of address allocated by the visited network to avoid having to tunnel internet protocol packets back to its home network. Mobile IPv6 does not use a foreign agent. However, it has been proposed to use a proxy for the mobile node within a visited network so that the mobile node can roam to a different attachment point within the visited network and acquire a care of address at those different attachment points in order to allow internet protocol packets to be tunnelled through the visited network to the mobile node. For this purpose the mobile node is allocated a mobile node home network proxy (MM-HNP), which points to the LMA within the visited network. Thereafter, the LMA allocates a care of address to the mobile node so that the mobile node can move to different attachment points. As such a further example embodiment of the present invention which works with proxy mobile IP includes a local mobile agent which is located in the visited network. The route of the traffic sent to the mobile node for this example is different from that presented above in that the traffic must be routed through the home gateway node in the home network before it is received by the LMA in the visited network. In order for this enhancement to work with embodiments of the present invention, the protocol inter-working function performs a tunnel switching protocol which takes account of the MN-HNP in order to tunnel IP packets via the mobile node's home network. An example is illustrated in FIG. 6.

To manage mobility (efficiently) locally, the LMA (Local Mobile Agent) is located in the VPLMN, e.g. co-located in the serving gateway while the Wireless Access Gateway (WAG) is located in the non-3GPP access networks in VPLMN. The route of the traffic sent to the MN, in this case, is different from the general case in that the traffic must be routed through the home gateway in HPLMN before being received by the LMA in the VPLMN, i.e. the mobile node has roamed to the visited access network, but the traffic is routed via the HPLMN. To this end, the following must be established:

the address used by the application/services must belong to the HPLMN (vs. the VPLMN address/PMIPv6 domain in the previous case)

Home serving gateway must be serving as the home agent to which all the traffic must be sent to before being tunnelled to the LMA and then tunnelled to the wireless access gateway before being sent to the MN.

The following shows the traffic path in the down link direction: from a Correspondent Node (CN) to the MN.

CN=>home PDN gateway in HPLMN=>GTP Tunnel(s)=>LMA (VPLMN)=>PMIP Tunnels=>Mgateway=>MN.

To address the above problem the following changes need to be made:

PMIP wireless access gateway advertises the Route Advertisements to the MN which is connected to the non-3GPP Access networks where the wireless access gateway is located but the mobile node with PMIP does NOT configure its services/applications using this address (which would otherwise be used in the PMIP case). The local access network link with the advertised Home Network Prefix, i.e. MN does not accept the NHP as the "home address".

Instead, the wireless access gateway sends the Proxy binding update with the Home IP Addr. Req and the PMIP Domain Address included to the LMA.

When the LMA receives the Proxy binding update, it performs the following operations register the PMIP Domain Address (MN-NHP) to be used for PMIP tunnel between LMA and wireless access gateway.

creation and transmission of the Create (Default) Bearer Request including the Home IP Address Req. via the protocol inter-working function in the visited serving gateway to the home PDN gateway in the HPLMN.

Upon receiving the Create (Default) Bearer Request and after checking up the hPCRF policies for QoS and charging/service access rules, the home gateway allocates the Home Address of the mobile node and returns Create (Default) Bearer Response and sends it to the visited serving gateway in VPLMN. As result, a GTP tunnel is established between the home packet data gateway and the visited serving gateway.

Upon receiving the Create (Default) Bearer Response, the LMA (the visited serving gateway in VPLMN) uses its inter-working function to generate and send a Proxy binding update response with the allocated Home IP Address to the wirekless access gateway (could be the PDG in the case of S2b). As a result, PMIP tunnel is set up between wireless access gateway and the LMA.

The wireless access gateway encapsulates the mobile node's Home IP Address in its Router Advertisement which is then acquired by the mobile node.

As an example, a packet sent from CN to mobile node will be:

Send to HPLMN because MN uses HPLMN address(s).

PDN gateway intercepts the packet (because it is the GGSN of the HPLMN, at which the packet first arrives).

PDN gateway encapsulates the packet in GTP tunnel as follows:

Outer IP Header: Dst. Addr: visited serving gateway (LMA) in VPLMN,

Src. Addr: PDN Addr
UDP Header:
GTP Header (visited serving gateway and PDN WG as the endpoints)
Inner IP Header: Dst. Addr. mobile node's Home IP Addr, Src Addr. CN's Addr.

When the packet arrives at the visited serving gateway (LMA) in VPLMN, visited serving gateway de-capsulate the packet from the GTP tunnel and then encapsulate the Inner IP Packet into the PMIP tunnel.

Outer IP Header: Dst. Addr. Proxy CoA (wireless access gateway) of mobile node, Src. Addr: LMA Addr.
Inner IP Header: Dst. Addr. mobile node's Home IP Address, Src. Addr: CN's Addr.

Uplink Data Transmission Reverse Tunneling

Reverse tunnelling is needed when mobile node sends packets to CN without being blocked by the egress interface in the local access network due to the mismatch of the source address being the mobile node's Home PLMN's address and the originating network domain's address being the VPLMN.

The reverse tunneling is as follows:
MN=>wireless access gateway=>PMIP Reverse Tunnel=>visited serving gateway (LMA) GTP tunnel=home packet data gateway.

To set up the reverse tunnel, the wireless access gateway encapsulates the packets originated from mobile node using Proxy CoA as the source address and the visited serving gateway (LMA) address as the destination address.

When it arrives at the visited serving gateway, the visited serving gateway de-encapsulates the packet and then encapsulates the inner IP packet using the GTP tunnel.

The general description presented above is illustrated in FIG. 6. In FIG. 6, the mobile node 2 as for the examples explained above, communicates an IP packet 80 having a destination address of the LMA 82 and a source address of the mobile nodes proxy care of address 84. The IP packet 80 also includes a field indicating that the packet is forming a binding update 86, a field providing the mobile node's unique identifier 88 and a field identifying a request for a home IP address 90. As explained above, the mobile node 2 communicates the binding update packet via the non-3GPP wireless access gateway 10 to the visited serving gateway node 20. For this example of proxy mobile IP, the IP packet representing the binding update 80 is communicated by a local mobile agent 92 which replaces the destination address of the IP packet 80 with the address of the visited gateway and the source address as the MN-HNP 94, 96, and forms an IP packet 80.1 which is communicated to the visited serving gateway. Thereafter, as explained with reference to FIG. 5 the visited serving gateway interprets the proxy binding update packet 80.1 as a create default bearer request and using the mobile node's unique identifier in the field 88 identifies the home network and therefore the home packet data network gateway 12. As with the previous examples, thereafter the home packet data gateway allocates a home IP address which is communicated to the mobile node 2 via the mobile agent 92 using the MM-HNP address which is replaced by the care of address of the mobile node.

Having acquired a home IP address the mobile node launches an application and for example communicates with a correspondent node 100. Thus, in operation when communicating with an IP packet 102 from the correspondent node 100 via the home network, the correspondent node includes the mobile nodes allocated home address in the destination field 104 and the correspondent nodes source address in the source address field 106 with data in a payload field 108. Within the home gateway node 12 the home gateway tunnels the IP packet 102 to the local mobile agent 92 via the visited serving gateway by tunnelling the IP packet 102 to the visited serving gateway 20 and then the local mobile agent 92 by putting the IP packet 102 into an IP packet with a destination address field having the MM-HNP address and the source address field being the mobile node home IP address 110, 112. Within the local mobile agent 92, the destination address field 110 is replaced with the proxy care of address of the mobile node with the source address 112 being replaced by the local mobile agent's address. Thus the mobile node 2 receives the packet 102 from the non-3GPP wireless access gateway 10 by de-encapsulating the tunnelled IP packet 114.

Other Examples

Initial Attach on S2a using MIPv4 FA to access the non-3GPP Access System
Initial Attach on S2c using CMIP to access the non-3GPP Access System
For cases where dedicated bearers are set up, it is similar except for the trigger message from serving gateway should the Create Dedicated Bearer Request without requesting a new IP address.

Various modifications may be made to the example embodiments described above without departing from the scope of the present invention.

The invention claimed is:

1. A mobile node arranged to provide a communications service to a user using an internet protocol, after the mobile node has roamed from a first home access network to a second visited access network and attached to a wireless access gateway, the second visited access network including a Local Mobile Agent arranged to manage mobility of the mobile node in the second visited access network, the mobile node comprising:
a non-transitory computer-readable medium comprising instructions stored thereon;
a computer configured by the instructions to perform acts of:
communicating a Binding Update message to a visited serving gateway node of the second visited access network via the wireless access gateway and the Local Mobile Agent using the internet protocol, the Binding Update message including a request for a home internet protocol address for the mobile node as if the mobile node were attached to the first home access network, and
receiving, in response to said Binding Update message, a home internet protocol address from said wireless access gateway, said Binding Update request triggering an establishment of a second tunnel between the Local Mobile Agent and the wireless access gateway of the second visited access network and a first tunnel between a home packet data gateway of the first home access network and the visited serving gateway node of the second visited access network,
wherein internet traffic to and from the mobile node is routed through said first and second tunnels.

2. A serving gateway node forming part of a mobile access network,
the serving gateway node being operable to provide a mobile node with a home internet protocol address as if the mobile node were attached to a home access network of the mobile node, the serving gateway node comprising:

a non-transitory computer-readable medium comprising instructions stored thereon;
a computer configured by the instructions to perform acts of:
receiving a Binding Update message from the mobile node, the Binding Update message comprising a request for a home internet protocol address and communicated to the serving gateway node of the mobile access network via a Local Mobile Agent and a wireless access gateway using an internet protocol, to which a mobile node has attached,
establishing, in response to said Binding Update message, a first tunnel between said serving gateway node and a home packet data gateway of the home access network;
providing said mobile node with a home internet protocol address via said wireless access gateway,
wherein internet traffic to and from the mobile node is routed through said first tunnel and a second tunnel established between the Local Mobile Agent and the wireless access gateway.

3. A method of communicating data to and from a mobile node using an internet protocol in response to the mobile node roaming from a first home access network to a second visited access network and attaching to a wireless access gateway which is connected to the second visited access network, the method comprising:
communicating a Binding Update message from the mobile node to a visited serving gateway node of the second visited access network via the wireless access gateway and a Local Mobile Agent of the second visited access network using an internet protocol, the binding update message including a request for a home internet protocol address for the mobile node as if the mobile node were attached to the first home network;
creating in said wireless access gateway node, in response to the binding update message from the mobile node, an associated proxy binding update message;
in response to the proxy binding update message from the wireless access gateway node, establishing a second tunnel to the first home access network;
establishing a first tunnel to said Local Mobile Agent;
communicating to said mobile node a home internet protocol address via said wireless access gateway;
routing internet traffic to and from the mobile node through said first tunnel and said second tunnel.

4. A non-transitory computer readable carrier including computer program instructions that cause a computer of a serving gateway node of a mobile access network to implement a method of providing a mobile node with an internet protocol address as if the mobile node were attached to a home access network of the mobile node, said computer program instructions comprising:
instructions to receive the Binding Update message from the mobile node, the Binding Update message comprising a request for a home internet protocol address for the mobile node as if the mobile node were attached to the home access network and communicated to the serving gateway node of the mobile access network via a Local Mobile Agent and a wireless access gateway using an internet protocol, to which a mobile node has attached,
instructions to establish a first tunnel between said serving gateway node and a home packet data gateway of the home access network;
instructions to provide said mobile node with a home internet protocol address via said wireless access gateway,
instruction to route internet traffic to and from the mobile node through said first tunnel and a second tunnel established between the Local Mobile Agent and the wireless access gateway.

5. A non-transitory computer readable carrier including computer program instructions that cause a mobile node to implement a method of providing a communications service to a user using an internet protocol, after the mobile node has roamed from a first home access network to a second visited access network and attached to a wireless access gateway, the second visited access network including a Local Mobile Agent arranged to manage mobility of the mobile node in the second visited access network, said computer program instructions comprising:
instructions to communicate a Binding Update message to a visited serving gateway node of the second visited access network via the wireless access gateway and the Local Mobile Agent using the internet protocol, the Binding Update message including a request for a home internet protocol address for the mobile node as if the mobile node were attached to the first home access network, said Binding Update request triggering an establishment of a second tunnel between the Local Mobile Agent and the wireless access gateway of the second visited access network and a first tunnel between a home packet data gateway of the first home access network and a visited serving gateway node of the second visited access network,
instructions to receive, in response to said Binding Update message, a home internet protocol address from said wireless access gateway, through a first tunnel established between a home packet data gateway of the first home access network and the visited serving gateway node of the second visited access network, and a second tunnel established between the Local Mobile Agent and the wireless access gateway of the second visited access network
wherein internet traffic to and from the mobile node is routed through said first and second tunnels.

6. A telecommunications system arranged to provide a facility for communicating data to and from a mobile node using an internet protocol, the system comprising:
a first home access network, which includes a home gateway node,
a second visited access network, which includes a visited serving gateway node, a Local Mobile Agent arranged to manage mobility of the mobile node in the second visited access network, and
a wireless access gateway operable to communicate data to and from the mobile node using the internet protocol, wherein
the mobile node is operable to communicate a binding update message to the visited serving gateway node of the second visited access network via the wireless access gateway and the Local Mobile Agent using the internet protocol, the binding update message including a request for a home internet protocol address for the mobile node as if the mobile node were attached to the first home access network, and
the wireless access gateway node is operable, in response to the binding update message from the mobile node, to create an associated proxy binding update message and to participate in establishment of a tunnel to the Local Mobile Agent, and
the Local Mobile Agent node of the second visited access network is operable, in response to the proxy binding update message from the wireless access gateway node, to participate in establishment of a second tunnel to the home first access network.

7. The telecommunications system as claimed in claim 6, wherein the visited serving gateway node of the second visited access network includes:
  a protocol inter-working function operable to convert the Binding Update message received in accordance with the internet protocol into a form for communication via a tunneling protocol used for communication of data to and from the home gateway node within the first access network.

8. The telecommunications system as claimed in claim 7, wherein the visited serving gateway node is operable in response to the Binding Update request received from the mobile node to send a create bearer request message to the home gateway node of the first access network using the tunneling protocol, with the request for a home internet protocol address of the mobile node, the serving gateway node being operable in response to provide the home internet protocol address of the mobile node.

9. The telecommunications system as claimed in claim 8, wherein, upon receiving the Binding Update request message from the mobile node, the protocol interworking function is operable to generate a Service Request message and to communicate the Service Request message to the Local Mobile Agent, the Local Mobile Agent being operable to generate the create bearer request message which is sent by the visited serving gateway node to the home gateway node.

10. The telecommunications system as claimed in claim 7, wherein the tunneling protocol is the General Packet Radio System Tunneling Protocol as specified by the Third Generation Project Partnership.

11. The telecommunications system as claimed in claim 6, wherein the visited serving gateway node of the second visited access network includes:
  a protocol switching function operable to select between an internet protocol and a tunneling protocol for communicating between the visited serving gateway node and the home gateway node in the first access network, in accordance with a configuration of the first access network.

* * * * *